United States Patent [19]

Ferris et al.

[11] Patent Number: 4,804,315

[45] Date of Patent: Feb. 14, 1989

[54] COMPOSITE HELICOPTER SWASHPLATE

[75] Inventors: Donald L. Ferris, Newtown, Conn.; Francis E. Byrnes, White Plains, N.Y.; Lawrence N. Varholak, Jr., Southbury, Conn.

[73] Assignee: United Technologies Corporation, Hartford, Conn.

[21] Appl. No.: 80,369

[22] Filed: Jul. 30, 1987

[51] Int. Cl.[4] ............................................. B64C 27/74
[52] U.S. Cl. ................................... 416/114; 416/230; 416/244 R; 416/134 A
[58] Field of Search ............... 416/114, 115, 134 A, 416/230 A, 244 D; 74/60

[56] References Cited

U.S. PATENT DOCUMENTS

| | | | |
|---|---|---|---|
| 3,734,644 | 5/1973 | Garcia | 416/114 |
| 3,841,586 | 10/1974 | Broadley et al. | 416/114 X |
| 4,425,082 | 1/1984 | Mussi et al. | 416/230 A X |
| 4,512,717 | 4/1985 | Pancotti et al. | 416/134 A |
| 4,521,157 | 6/1985 | Caramaschi et al. | 416/134 A |
| 4,534,704 | 8/1985 | McArdle | 416/158 |
| 4,538,961 | 9/1985 | Pariani | 416/114 |
| 4,556,365 | 12/1985 | Mouille et al. | 416/230 A |
| 4,588,355 | 5/1986 | Ferris et al. | 416/114 |
| 4,629,644 | 12/1986 | Matuska | 416/230 A X |
| 4,688,993 | 8/1987 | Ferris et al. | 416/114 |

Primary Examiner—Everette A. Powell, Jr.

[57] ABSTRACT

A helicopter composite swashplate ring that has a triaxial braided tubular ring that withstands both forces in-plane and normal to the plane of the swashplate. The triaxial braided tubular ring comprises substantially circumferential fibers interwoven with angled fibers oriented at a predetermined angle to the circumferential fibers. The tubular ring contains a composite circumferential spacer ring that comprises an upper ring plate connected to a lower ring plate by a plurality of first tubular support members. The upper ring plate and lower ring plate are adjacent the inside upper and insider lower surfaces of the tubular ring, respectively. The upper and lower plates have openings in alignment with the first tubular support members. The ring plates have a plurality of sections extending radially outward. The sections have lug openings that are in alignment with a plurality of second vertical support members to form channels therethrough for accepting servo or control rod lugs.

1 Claim, 2 Drawing Sheets

COMPOSITE HELICOPTER SWASHPLATE

DESCRIPTION

1. Technical Field

The field of art to which this invention pertains is helicopter swashplates and particularly swashplates comprising fiber reinforced epoxy matrix composite.

2. Background Art

Historically, helicopter swashplates have been made of high strength, lightweight, critical metals or alloys. Although these metal components have performed adequately, there are a number of drawbacks inherent to these materials. Three important areas where these materials possess less than optimum features are weight, availability and damage tolerance.

Weight has always been a consideration in helicopter construction and with increasing fuel costs it has become a primary objective to reduce the weight of the overall helicopter by using lighter materials. At present aluminum and titanium are used extensively because of their light weight and strength, however, there is a constant search for lighter and stronger materials. In addition, many of these lightweight metals are classified as "critical" materials with their primary availability being through importation. As has been demonstrated by the oil embargoes of past years, reliance on foreign sources for these materials is not desirable. Furthermore, these metals do not impart a damage tolerance to their components. That is, when a metal component starts to weaken, through fatigue or otherwise, cracks are generated. These cracks continue to grow quickly as there is nothing to stop their propagation and the component part can fail completely. As can be appreciated, this lack of damage tolerance can be disastrous in a helicopter.

In order to overcome the shortcomings of such metal components, the industry has taken two approaches. One is to build a redundant component so that should one fail, the other will allow for safe landing. The second is to overdesign the particular part such that it would have much greater strength than would normally be required under normal circumstances. Both of these approaches add weight to the aircraft as well as increased cost and reliance on critical metals.

Recently, composite materials have been used as replacement parts for many metal components due to their light weight and relatively low cost. For example, composite materials are now being used in main structural components such as main rotor blades and tail rotor assemblies on helicopters. However, it is not always practical to replace a metal component with a composite material due to particular design considerations and shortcomings in the composite physical properties.

Typically, in-plane swashplate rings are made from forged aluminum stock, machined to an appropriate final diameter for mounting control rods (outer rotating ring), input linkage (inner stationary ring) and scissors linkage. The outer rotating swashplate ring includes lug mounts which extend radially outboard therefrom for articulatively mount control rod linkages and pivot mounting at least one scissors linkage. Similarly, the inner swashplate ring includes lug mounts which extend radially inboard therefrom for mounting input linkages and pivot mounting at least one scissors linkage.

Accordingly, what is needed in this art are damage tolerant, relatively inexpensive and lightweight composite components capable of withstanding the forces developed in a helicopter swashplate assembly.

DISCLOSURE OF INVENTION

This invention is directed to a helicopter composite swashplate ring that has a triaxial braided tubular ring that withstands both forces in-plane and normal to the plane of the swashplate. The triaxial braided tubular ring comprises substantially circumferential fibers interwoven with angled fibers oriented at a predetermined angle to the circumferential fibers. The tubular ring contains a composite circumferential spacer ring that comprises an upper ring plate connected to a lower ring plate by a plurality of first tubular support members. The upper ring plate and lower ring plate are adjacent the inside upper and inside lower surfaces of the tubular ring, respectively. The upper and lower plates have openings in alignment with the first tubular support members. The ring plates have a plurality of sections extending radially outward. The sections have lug openings that are in alignment with a plurality of second vertical support members to form channels therethrough for accepting servo or control rod lugs.

This swashplate withstands interlaminar shear forces that would delaminate conventional composite swashplate laminates. Thus, it makes a significant advance in the field of swashplate assemblies.

The foregoing and other objects, features and advantages will be apparent from the specification, claims and from the accompanying drawings which will illustrate an embodiment of the invention.

BEST MODE FOR CARRYING OUT THE INVENTION

Triaxial braided tubular composite is critical to this invention. Triaxial interwoven braided fibers result in an integral component that has no bond lines such as are present in conventional laminate composites (e.g., commonly assigned U.S. Pat. No. 4,568,245). Thus, primary loads, other than push rod control loads, resulting from shear forces due to lift are reacted by the fibers in the ring and not by the resin matrix. Triaxial braided tubular material has been available, for example, from Fiber Innovations, Inc. (Norwood, Mass.). Alternatively, a continuous ring braider may be modified to form a split bed braider suitable for braiding continuous tubular rings. A continuous ring braider such as that available from the New England Butt Division of Wardwell Braiding Machine Company (Central Falls, R.I.) is cut across a diameter to form two half-rings. The two half-rings are attached with a hinge (to reform the ring) so that the bed may be opened to allow removal of the braided ring from the bed. A locking mechanism is provided to keep the half-rings joined together during operation.

Typically, the braided tubular composite typically uses as the graphite fiber reinforcement, high strength graphite fiber which has a minimum filament modulus of $30 \times 10^6$ psi. The individual fibers are generally about 0.35 to about 0.399 mil in diameter. The graphite fiber may be purchased from, for example, Hercules, Inc. (Wilmington, Del.) in dry roving form. It is preferred that the cured graphite/resin composite should contain about 55% fibers by volume, although percentages as high as 60% and as low as 50% may be tolerated without affecting the mechanical properties.

Preferably, a resin matrix such as epoxy is selected to be compatible with the fiber reinforcement. It is also desirable that the epoxy resin be satisfactorily curable at low pressures (i.e., about 20 to about 100 psig). One such resin system, Dow Tactax 123 TM Resin and Dow Tactax TM H41 hardener, is available from Dow Industries.

Figure 1:
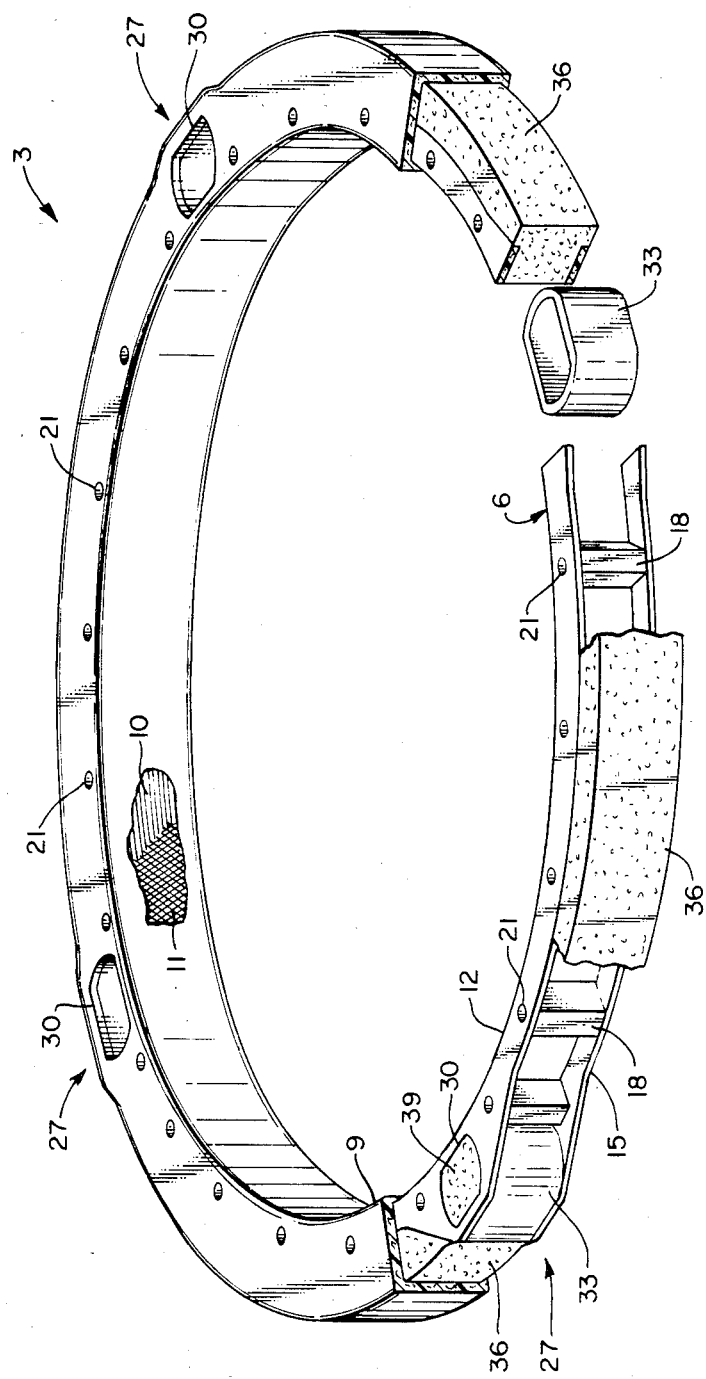
FIG. 1 is a perspective view cutaway of the composite swashplate of this invention.

According to FIG. 1, the braided tubular ring 9 that surrounds the spacer ring 6 has a triaxial braid comprising circumferential fibers 10 interwoven with angled fibers 11 oriented at about ±30° to about ±60° with respect to the circumferential fibers 10. The circumferential fibers 10 are preferably coplanar with the braided ring 9, however, minor deviations from 0° e.g., ±5°) can be tolerated. Above about 10° off axis the circumferential fibers have a reduced capability to withstand the bending moments that the swashplates are subject to, resulting in a degradation in strength. Below about 30° and above about 60°, the angled fibers 11 are not able to withstand the transverse shear forces (e.g., caused by pushrod control loads) that can cause delamination. For example, it was found that conventional composite laminate swashplates can delaminate when subjected to bending fatigue testing.

According to FIG. 1 which illustrates a swashplate ring 3 broken away to expose its interior, a circumferential spacer ring 6 is enclosed by a triaxial braided tubular ring 9. The spacer ring 6 comprises an upper ring plate 12 and a lower ring plate 15 which are typically identical in shape. Typically, the ring plates are substantially circumferential in shape with a plurality of radially outward extending locator sections 27. Upper and lower ring plates 12, 15 are joined and supported apart by a plurality of spaced apart vertical support members 18. The vertical support members 18 are circumferentially located with respect to the outward extending locator sections 27 described below. The vertical support members 18 are disposed around the interior periphery of the ring 6 so that they are adjacent the interior of the inner periphery of the braided tubular ring 9. Thus, once these ring plates 12, 15 and vertical support members 18 are covered by the triaxial braided tubular ring 9, vertical holes 21 (e.g., aligned apertures) may be drilled through the triaxial ring, ring plates 12, 15 and vertical support members 18. The aligned apertures are formed through the ring plates 12, 15 and support members 18 for accepting through bolts 24. Ring plates 12, 15 are clamped by through bolts 24 against the outside upper and lower surfaces of the triaxial braided tubular ring 9.

The upper and lower ring plates 12, 15 have a plurality of locator sections 27 that extend radially outward. The number of locator sections 27 typically corresponds to the number of servo or control rod lugs desired. The upper and lower plate locator sections 27 have aligned lug openings 30 for accepting the servo or control rod lugs. Between the upper and lower plates 12, 15 and in alignment with the lug openings 30 are composite tubular lug members 33 thus providing lug core channels. The radial extending locator sections 27 serve to locate the lug 30 openings so that after the assembly is molded and cured, holes drilled through the braided tubular ring 9 will pass through the lug openings 30 and tubular lug members 33.

Premolded circular sections of closed cell foam blocks 36 are disposed between the upper and lower ring plates 12, 15 and between the tubular lug members 33. In addition, the foam blocks 36 are fitted between and around (i.e., exterior to) the vertical support members 18. The foam blocks 36 extend radially beyond the ring plate width and are sized to provide the desired width, and thus desired strength, to the ring cross-section once wrapped by the braided fibers. However, the width is chosen not to exceed the width of the locator sections 27. Foam blocks 39 are also disposed in lug openings 30. The foam blocks 36, 39 provide a continuous backing for the braided ring 9. The foam blocks 39 disposed in lug openings 30 may easily be removed after molding and curing.

The swashplate ring 3 can be made as follows. Composite spacer ring 6 including vertical members 18 is, for example molded of chopped fibers and a suitable resin. Alternatively, upper and lower plates 12, 15 may be laid up and cured and later joined to premolded composite vertical members 18. Composite tubular lug members 33 are disposed between the locator sections 27 in alignment with lug openings 30 and may be joined to the spacer ring 6 by suitable means such as cold bonding. The foam blocks 36, 39 are positioned and joined by suitable means such as cold bonding to the plates 12, 15, vertical support members 18 and tubular lug members 33.

The above assembly serves as a permanent semistructural mandrel for the swashplate ring 3. The mandrel is covered by braiding a triaxial braid described above onto the mandrel and then molded by a resin transfer process. The dry fiber braid and mandrel are placed in a mold having the shape of the finished part, resin is injected and conventional heat and pressure are applied to cure the swashplate ring over conventional times. An alternate manufacturing approach would be to use prepreg roving for the triaxial braid and use a conventional prepreg molding process.

The lug openings 30 (located by the radially extending locator sections 27) are drilled through top and bottom surfaces of the braided sleeve and the foam blocks 39 are removed. Holes 24 are located by reference to locator sections 27 and drilled through top and bottom surfaces of the braided tubular ring 9.

Figure 2:
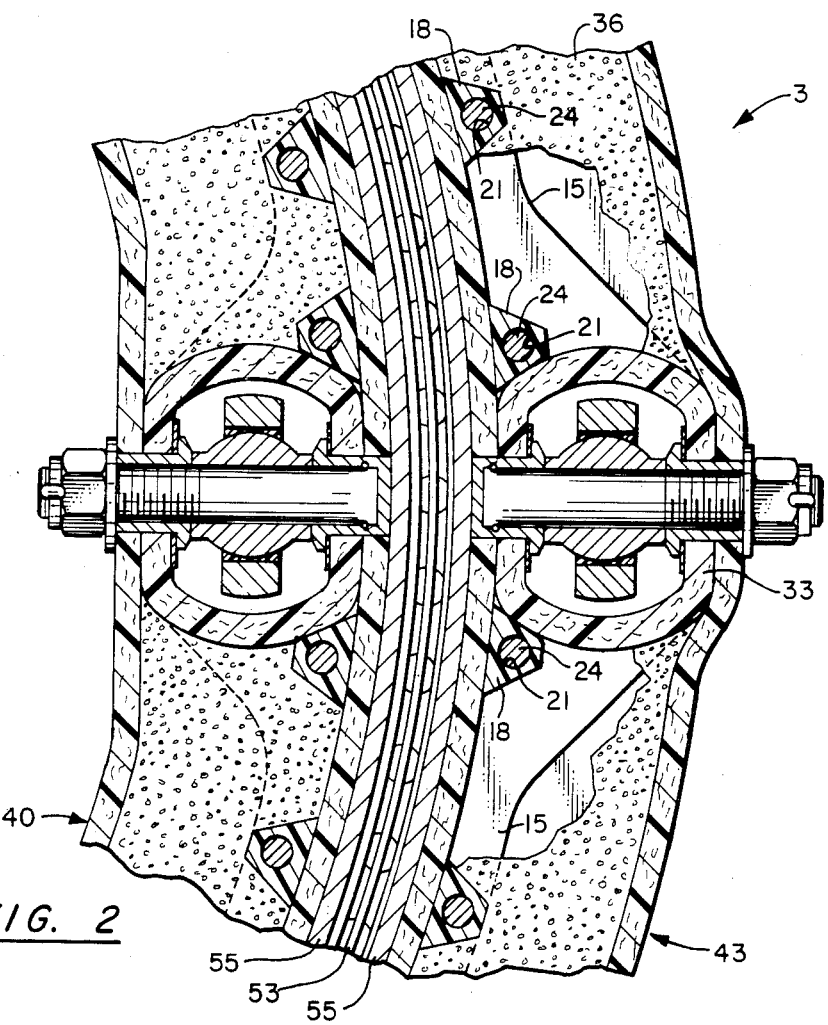
FIG. 2 illustrates a top view of two counter-rotating swashplate rings.
Figure 3:
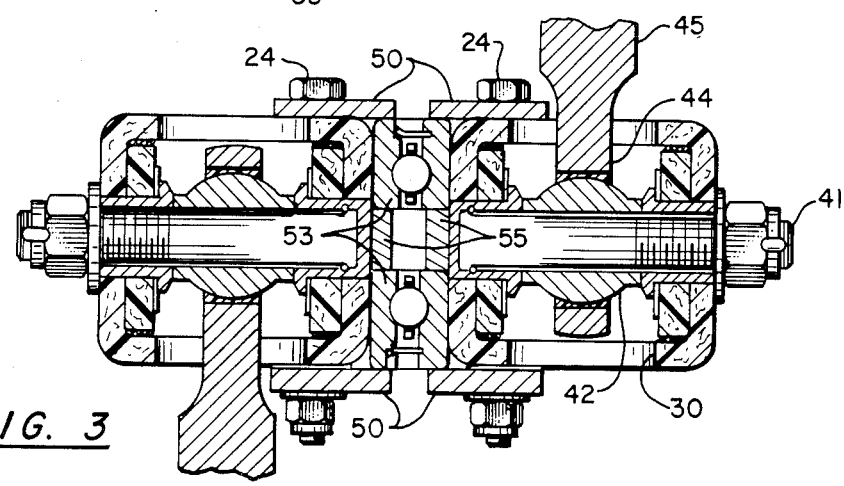
FIG. 3 illustrates a cross-section of the two counter-rotating swashplate rings of FIG. 2 taken along section A—A.

Typically, two of these swashplate rings are assembled in counterrotating fashion to serve as a swashplate. FIGS. 2 and 3 show top and cross-section views of two swashplate rings set in counterrotating fashion including control rod 44, retention bolt 41, control rod bearing 42, control rod outputs 45, swashplate bearings 53 between rotating 43 and stationary 40 swashplate assemblies separated by spacers 55 and bearing retainer plates 50. Vertical support members 18, holes 21 and bolts 24 are disposed on either side of the tubular lug members 33 as illustrated in FIG. 3 and FIG. 4. The through bolts 24 immediately adjacent tubular lug members 33 clamp bearing retainers 50 through the support members 18 bearing directly against the inside top and bottom surfaces of the cured braided tubular ring 9.

This braided composite swashplate ring withstands both forces in-plane and normal to the plane. The triaxial braiding process provides a means of tailoring the stiffness of the ring to obtain an optimum value (e.g., the quantity of 0° fibers and orientation of off axis fibers can be easily controlled). Importantly, it withstands interlaminar shear forces that can delaminate conventional composite laminates. It is a lightweight ring that provides a low frontal area. Also, the ring has multiple and redundant load paths which improve damage and ballistic tolerance and ballistic survivability. Finally, the triaxial braided composite material has improved fail safety as a result of slow crack propagation time.

Although the invention has been shown and described with respect to detailed embodiments, it should be understood by those skilled in the art that various changes and omissions in form and detail may be made therein without departing from the spirit and scope of the invention.

We claim:

1. A composite swashplate ring for a helicopter comprising:
   (a) a triaxial braided tubular ring having inside, outside, upper and lower surfaces;
   (b) said tubular ring containing a composite circumferential spacer ring;
   (c) said triaxial braided tubular ring having substantially circumferential fibers interwoven with angled fibers oriented at a predetermined angle to said circumferential fibers;
   (d) said spacer ring including an upper ring plate adjacent said upper tubular ring surface and a lower ring plate adjacent said lower tubular surface;
   (e) said ring plates connected by a plurality of first tubular support members;
   (f) said upper and lower plates having first openings in alignment with said first tubular support members to form a channel therethrough;
   (g) a plurality of second vertical support members spaced substantially symmetrical about said ring plates and disposed between said plates; and
   (h) said upper and lower ring plates having a plurality of sections extending radially outward from the ring plates, said sections having lug openings in alignment with said second tubular support members to form a channel therethrough for accepting servo or control rod lugs.

* * * * *